(12) United States Patent
Ai

(10) Patent No.: US 11,258,157 B2
(45) Date of Patent: Feb. 22, 2022

(54) BRACKET AND ANTENNA UNIT

(71) Applicant: CommScope Technologies LLC, Hickory, NC (US)

(72) Inventor: Bin Ai, Suzhou (CN)

(73) Assignee: CommScope Technologies LLC, Hickory, NC (US)

(*) Notice: Subject to any disclaimer, the term of this patent is extended or adjusted under 35 U.S.C. 154(b) by 237 days.

(21) Appl. No.: 16/508,360

(22) Filed: Jul. 11, 2019

(65) Prior Publication Data

US 2020/0028235 A1  Jan. 23, 2020

(30) Foreign Application Priority Data

Jul. 18, 2018 (CN) .......................... 201810786959.0

(51) Int. Cl.
*H01Q 1/12* (2006.01)
*F16M 13/02* (2006.01)

(52) U.S. Cl.
CPC .......... *H01Q 1/1207* (2013.01); *F16M 13/02* (2013.01); *H01Q 1/12* (2013.01)

(58) Field of Classification Search
CPC .......... H01Q 1/1207; H01Q 1/12; H01Q 1/48; H01Q 1/42; H01Q 1/50; H01Q 9/16; F16M 13/02; H01P 3/081; H05K 1/0243

USPC .. 248/558, 27.1, 27.3, 205.1, 213.2, 220.21, 248/222.11
See application file for complete search history.

(56) References Cited

U.S. PATENT DOCUMENTS

| | | | |
|---|---|---|---|
| 4,533,191 A * | 8/1985 | Blackwood | H01R 4/2429 29/838 |
| 9,207,260 B2 * | 12/2015 | Ogasawara | G01R 1/06772 |
| 2016/0020504 A1 * | 1/2016 | Michaelis | H01Q 1/125 342/359 |
| 2019/0044258 A1 * | 2/2019 | Everest | H01Q 1/16 |
| 2020/0220251 A1 * | 7/2020 | Ai | H01Q 1/246 |
| 2021/0098864 A1 * | 4/2021 | Zhang | H01Q 1/246 |
| 2021/0119339 A1 * | 4/2021 | Smith, Jr. | H01Q 1/42 |
| 2021/0227684 A1 * | 7/2021 | Wang | H01P 3/08 |

* cited by examiner

*Primary Examiner* — Nkeisha Smith
(74) *Attorney, Agent, or Firm* — Myers Bigel, P.A.

(57) ABSTRACT

A bracket comprises: a bracket body, at least one PCB mounting mechanism and at least one isolation needle mounting mechanism. The PCB mounting mechanism is disposed on the bracket body, for mounting a PCB parasitic unit, and the isolation needle mounting mechanism is disposed on the bracket body, for mounting the isolation needle parasitic unit. The bracket is capable of mounting different types of parasitic units.

18 Claims, 5 Drawing Sheets

BRACKET AND ANTENNA UNIT

CROSS-REFERENCE TO RELATED APPLICATION

The present application claims priority under 35 U.S.C. § 119 to Chinese Patent Application No. 201810786959.0 (Serial No. 2018071801313330), filed Jul. 18, 2018, the entire content of which is incorporated herein by reference.

FIELD OF THE INVENTION

The present disclosure generally relates to the field antenna systems. More specifically, the present disclosure relates to a bracket and an antenna unit including the bracket.

BACKGROUND

Many known antenna systems include dipole radiators that are used to transmit radio frequency ("RF") signals. The dipole radiators are typically mounted as linear arrays or planar arrays of dipole radiators that are operated in a coordinated fashion to transmit and receive RF signals. The dipole radiators may, for example, be mounted to extend forwardly from a reflector. The reflector may comprise, for example, a metal sheet and may be used to reflect and send forwardly RF energy that is emitted by the dipole radiators in the rearward direction. In many applications, it may be desired that the radiation pattern or "antenna beam" that is formed by the dipole radiators have a certain shape and/or meet certain characteristics. For example, the half power (3 dB) beamwidth, the 10 dB beamwidth, and/or the magnitude of certain side lobes or back lobes may need to meet certain criteria. In many cases, these characteristics may not be met by a linear array (or planar array) of dipole radiators as initially designed. In order to adjust the radiation pattern, i.e. to adjust the relative magnitude of a transmitted RF signal in different directions, so-called parasitic units may be positioned around the dipole radiators. The size, shape, and distance of the dipole radiators from the parasitic units directly affect the radiation pattern. These parasitic units may be implemented in a variety of different ways. Two common types of parasitic units are printed circuit board ("PCB") based parasitic units in which metal patterns are formed on one or more layers of a PCB (herein referred to as a "PCB parasitic unit") and elongated metal parasitic units (also referred to as "isolation needles"). These parasitic units can be used to fine tune the radiation pattern generated by, for example, a linear array of dipole radiators to have a desired shape.

The typical PCB parasitic unit includes one or more dielectric substrates and a metal pattern that is formed on at least one of the substrates. Each PCB parasitic unit may be designed to modify a radiation pattern in a different way, and hence a large number of different PCB parasitic units may be required. The various PCB parasitic units may be mounted at different distances in front of the reflector in order to obtain the desired effect on the radiation pattern. The isolation needle parasitic units are also designed and manufactured in different shapes, and are disposed at different distances from the reflector for interference with or adjustment of the radiation pattern at different positions.

Since the above-described parasitic units often have different, complicated shapes and are disposed at different distances in front of the reflector, a wide variety of different brackets may be required to mount the different parasitic units in place in the desired locations. Most of the known brackets can only be used for mounting a single type of parasitic unit. In other words, existing brackets for parasitic units are mono-functional. For example, FIGS. 1A-1D show four different conventional parasitic unit brackets, each of which is configured to mount a single isolation needle parasitic unit at a particular distance in front of a reflector. As is well known, multiple different types of PCB parasitic units and isolation needle parasitic units may be used in an antenna system. As a result, an entire "family" of parasitic unit brackets may be required for each different antenna system, and hence designing and manufacturing the necessary different brackets may require an excessive number of parts and increase both manufacturing and installation costs.

SUMMARY

According to an aspect of the present disclosure, a bracket for mounting a parasitic unit in an antenna comprises: a bracket body, a PCB mounting mechanism provided on the bracket body that is configured to mount a PCB parasitic unit; and an isolation needle mounting mechanism provided on the bracket body that is configured to mount an isolation needle parasitic unit.

The brackets according to the present invention are capable of mounting different types of parasitic units at the same time, for example capable of mounting one or more PCB parasitic units and/or one or more isolation needle parasitic units at the same time.

In some embodiments, the PCB mounting mechanism includes a first PCB mounting mechanism that includes an abutment portion that is configured to abut against the PCB parasitic unit and a disengagement preventing portion that is configured to prevent the PCB parasitic unit from being disengaged from the abutment portion.

In some embodiments, a protrusion that is configured to receive the PCB parasitic unit is provided on a side of the disengagement preventing portion that faces the abutment portion.

In some embodiments, the PCB mounting mechanism further includes a second PCB mounting mechanism that includes a first accommodating portion that is configured to accommodate the PCB parasitic unit and a first holding portion that is configured to hold the PCB parasitic unit at the first accommodating portion.

In some embodiments, the first holding portion includes a resilient cantilevered plate that protrudes from the bracket body.

In some embodiments, the resilient cantilevered plate further includes a projection that is configured to pass through the PCB parasitic unit.

In some embodiments, the first accommodating portion includes a concave portion that is recessed inwardly from the bracket body.

In some embodiments, a plurality of additional PCB mounting mechanisms are provided on different sides of the bracket body.

In some embodiments, the isolation needle mounting mechanism includes a first isolation needle mounting mechanism that includes a second accommodating portion that is configured to accommodate the isolation needle parasitic unit and a second holding portion that is configured to hold the isolation needle parasitic unit at the second accommodating portion.

In some embodiments, the second holding portion includes a resilient cantilevered plate that protrudes from the bracket body.

In some embodiments, the second accommodating portion includes one or more concave portions that are recessed inwardly from the bracket body.

In some embodiments, the second accommodating portion includes a plurality of concave portions that are sequentially provided on the bracket body along a longitudinal direction of the bracket body.

In some embodiments, the a plurality of first isolation needle mounting mechanisms are respectively provided on opposed sides of the bracket body.

In some embodiments, the first holding portion and the second holding portion are formed as a monolithic part.

In some embodiments, the isolation needle mounting mechanism further includes a second isolation needle mounting mechanism, which includes at least two opposed clamping portions.

In some embodiments, the clamping portions protrude forwardly from the bracket body.

In some embodiments, one or more concave portions are provided on each clamping portion that are configured to accommodate the isolation needle parasitic unit.

In some embodiments, the bracket further comprises a body mounting mechanism at the bottom of the bracket body that is configured to connect the bracket body to an antenna.

In some embodiments, the body mounting mechanism includes a pin portion and a stop portion.

In some embodiments, the pin portion has a non-cylindrical shape.

In some embodiments, the PCB parasitic unit includes one or more parasitic unit blocks.

In some embodiments, the parasitic unit blocks are quadrangular.

In some embodiments, the parasitic unit blocks are connected in series and/or in parallel with each other.

In some embodiments, a first hole is provided in the PCB parasitic unit, and the disengagement preventing portion is configured to pass through the first hole.

In some embodiments, an undercut portion is provided on the PCB parasitic unit that is configured to engage with the first accommodating portion.

In some embodiments, a second hole is provided on the PCB parasitic unit that is configured to pass through the projection disposed on the first holding portion.

According to another aspect of the present disclosure, an antenna unit comprises: any of the aforementioned brackets, a PCB parasitic unit and an isolation needle parasitic unit, wherein the PCB parasitic unit is fixed on the bracket by the PCB mounting mechanism, and the isolation needle parasitic unit is fixed on the bracket by the isolation needle mounting mechanism.

The antenna unit according to the present disclosure has a standardized PCB parasitic unit and can be modularly designed and manufactured, thereby improving the production efficiency and reducing the production cost.

The PCB parasitic unit is standardized, so that its structure can be simply designed and manufactured, and the utilization ratio of the PCB material is improved, thereby further simplifying the design of the bracket and the assembly of the antenna unit.

DETAILED DESCRIPTION

Figure 1A:
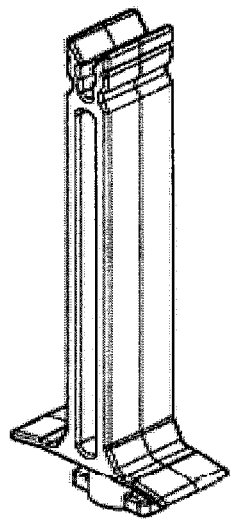
FIGS. 1A-1D are perspective views of example conventional parasitic unit brackets.
Figure 1B:
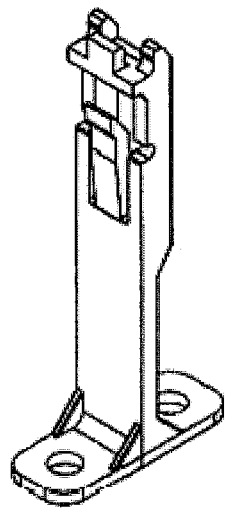
Figure 1C:
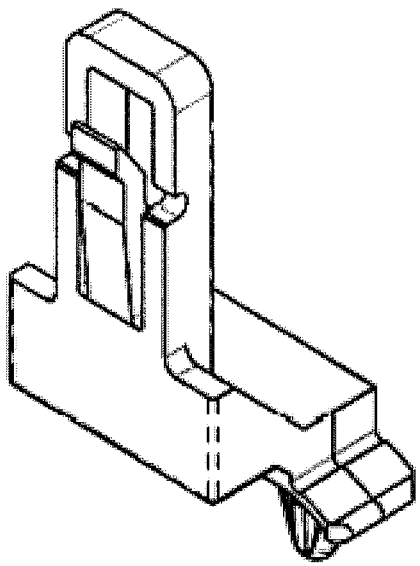
Figure 1D:
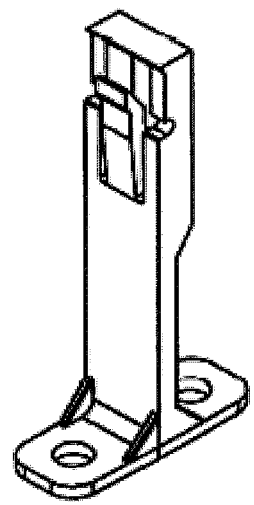

The present invention will be described below with reference to the drawings, in which several embodiments of the present invention are shown. It should be understood, however, that the present invention may be embodied in a variety of different ways, and is not limited to the example embodiments that are described herein. It should also be understood that, the embodiments disclosed herein can be combined in various ways to provide additional embodiments.

It should be understood that, in the drawings, the same reference signs are used to refer to the same elements. In the drawings, for the sake of clarity, the sizes of certain features may not be to scale.

It should be understood that, the wording in the specification is only used for describing particular embodiments and is not intended to define the present invention. The terms used in the specification (including the technical terms and scientific terms) have the meanings as normally understood by a person skilled in the art, unless otherwise defined. For the sake of conciseness and/or clarity, well-known functions or constructions may not be described in detail.

The singular forms "a/an", "said" and "the" as used in the specification, unless clearly indicated, all contain the plural forms. The terms "comprising", "containing" and "including" used in the specification indicate the presence of the claimed features, but do not preclude the presence of one or more other features. The term "and/or" as used in the specification includes any and all combinations of one or more of the relevant items listed.

In the specification, when one element is referred to as being "on" another element, "attached to" another element, "connected to" another element, "coupled to" another element, or "in contact with" another element, the element may be directly located on another element, attached to another element, connected to another element, coupled to another element, or in contact with another element, or there may be present with an intermediate element. In contrast, where one element is referred to as being "directly" on another element, "directly attached to" another element, "directly connected to" another element, "directly coupled to" another element, or "in direct contact with" another element, there will not be present with an intermediate element. In the specification, where one feature is arranged to be "adjacent" another feature, it may mean that one feature has a portion that overlaps with an adjacent feature or a portion that is located above or below an adjacent feature.

In the specification, words such as "up", "down", "left", "right", "front", "back", "high", "low" and the like may describe a spatial relationship of one feature with another feature in the drawings. It should be understood that, the these words are intended to encompass different orientations of the apparatus in use or operation, in addition to the orientations shown in the drawings. For example, when the apparatus in the drawings is flipped over, the features previously described as "below" other features may be described to be "above" other features at this time. The apparatus may also be otherwise oriented (rotated 90 degrees or at other orientations). In the description, the longitudinal direction refers to a direction extending along a length direction of the bracket, and the transverse direction refers to a direction perpendicular to the longitudinal direction.

Figure 2:
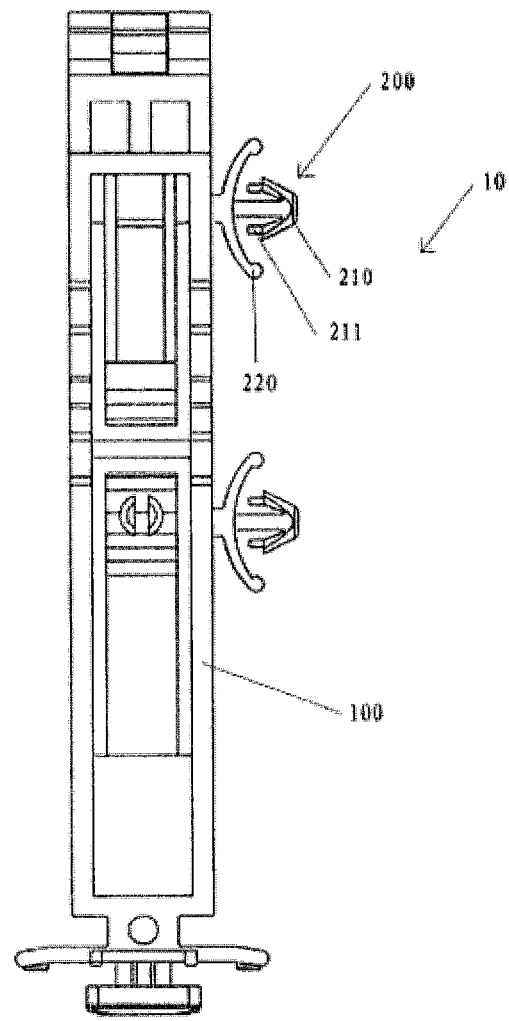
FIG. 2 is a front view of a parasitic unit bracket according to embodiments of the present disclosure.
Figure 3:
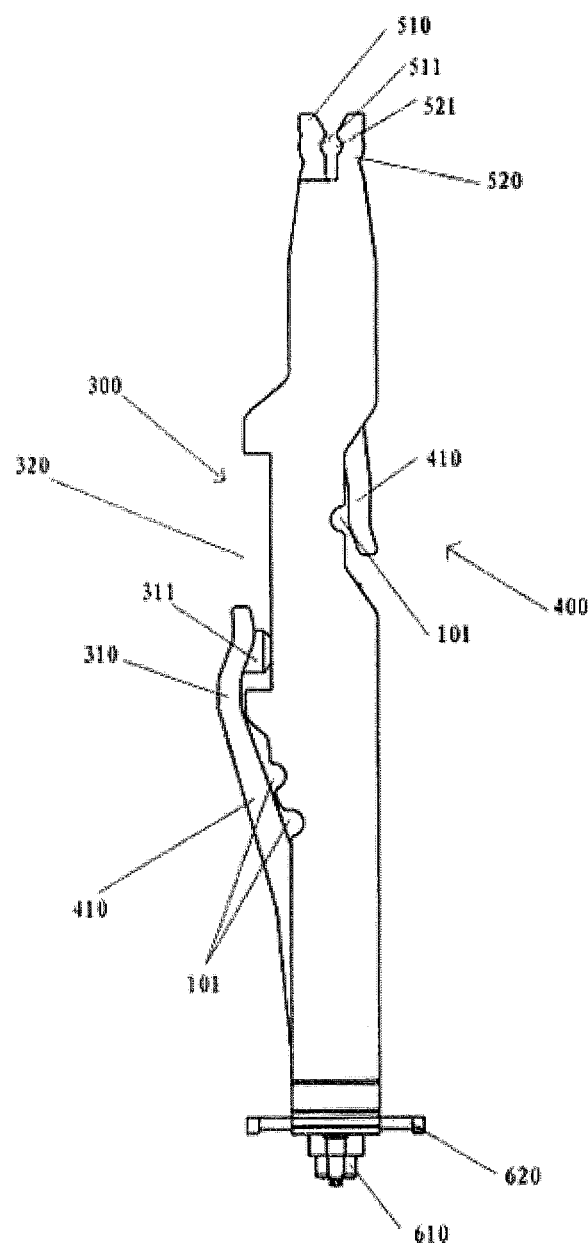
FIG. 3 is a side view of the bracket of FIG. 2.
Figure 4:
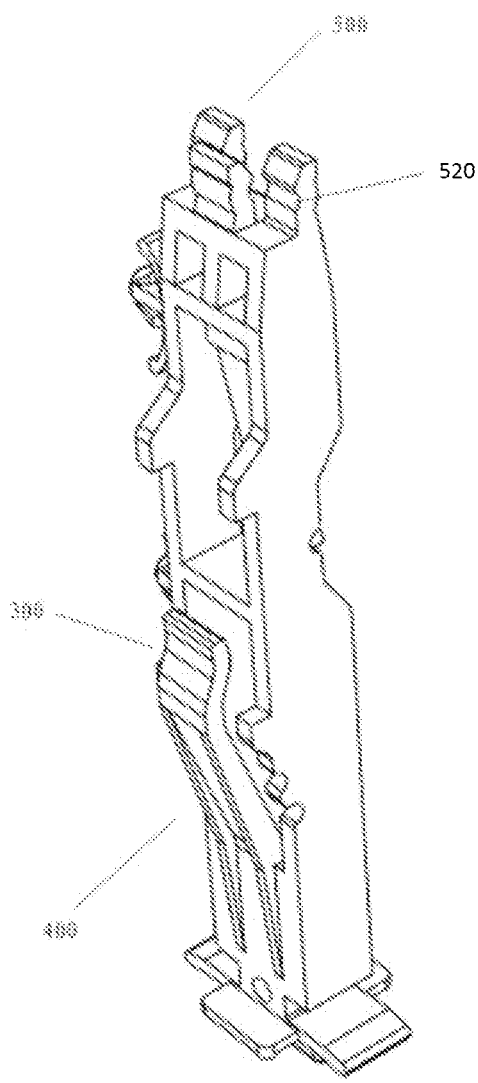
FIG. 4 is a perspective view of the bracket of FIG. 2.
Figure 9:
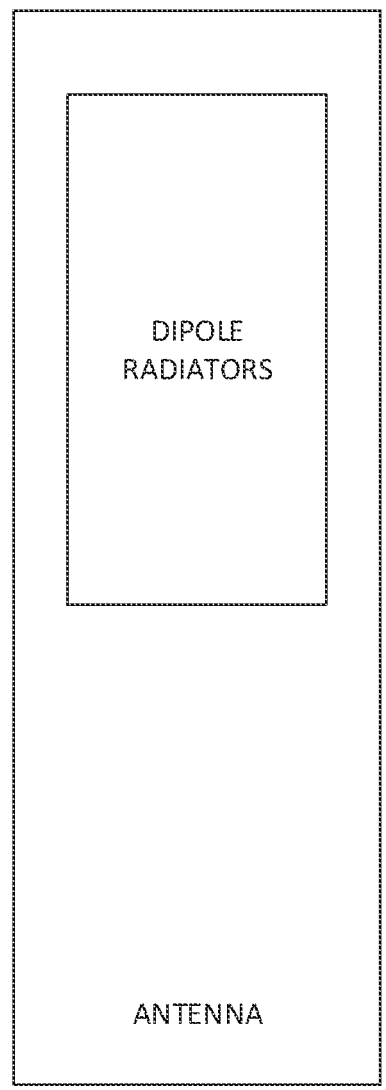
FIG. 9 is a schematic view of an antenna.

The bracket of the present disclosure can be used to mount a variety of different types of parasitic units of an antenna system, such as the antenna shown in FIG. 9 that includes a plurality of dipole radiators. Referring to FIGS. 2 to 4 and taking a PCB parasitic unit and an isolation needle parasitic unit as examples, a parasitic unit mounting bracket 10 according to the present disclosure will be described. The parasitic unit mounting bracket 10 includes an elongated bracket body 100 on which PCB mounting mechanisms 200, 300, isolation needle mounting mechanisms 400, 500 and the like are provided. The bracket body 100 may be made of a material such as plastic. The PCB mounting mechanisms 200, 300 are used to mount the PCB parasitic units 70 in front of a reflector. The PCB parasitic units 70 will be described in detail hereinafter. The isolation needle mounting mechanisms 400, 500 are used to mount an isolation needle parasitic units 80 in front of a reflector. Typical isolation needle parasitic units 80 are made of metal, such as aluminum, copper, copper-tin alloy, and the like.

The bracket body 100 is provided with at least one first PCB mounting mechanism 200, and in the example of FIGS. 2-4, two first PCB mounting mechanisms 200 are provided. Each first PCB mounting mechanism 200 may include a disengagement preventing portion 210 and an abutment 220. The disengagement preventing portion 210 is configured to prevent a PCB parasitic unit 70 from being disengaged from the parasitic unit mounting bracket 10 after the PCB parasitic unit 70 passes therethrough. The abutment portion 220 is configured to abut against the PCB parasitic unit 70 after the PCB parasitic unit 70 passes through the disengagement preventing portion 210.

The disengagement preventing portion 210 is in the shape of a bolt, and resilient in its radial direction, and in particular, is contractible radially inwards. The disengagement preventing portion 210 is disconnected in a circumferential direction. As shown in FIG. 2, the disengagement preventing portion 210 consists of two members that are disconnected from each other; in other embodiments, the disengagement preventing portion 210 may consist of more than two members that are disconnected from each other. The disengagement preventing portion 210 may be made of a rigid material or an elastic material. In some embodiments, the disengagement preventing portion 210 may be made of the same material (e.g., plastic) as the bracket body 100; however, in other embodiments, the disengagement preventing portion 210 may be made of other materials (e.g., rubber and the like).

In some embodiments, the disengagement preventing portion 210 is provided with a protrusion 211 on a side facing the abutment portion 220, for mounting the PCB parasitic unit 70. The protruding portion 211 has a diameter that is less than or equal to a diameter of a first hole 710 (see FIG. 5A) that is included in the PCB parasitic unit 70, and the disengagement preventing portion 210 has an outer diameter that is slightly larger than the first hole 710 of the PCB parasitic unit 70. In the depicted embodiment, the protruding portion 211 is made of the same material as the disengagement preventing portion 210; however, in other embodiments, the protruding portion 211 may be made of a material different than the disengagement preventing portion 210. In the depicted embodiment, the protruding portion 211 is integrally formed with the disengagement preventing portion 210; however, the extension portion 211 may also be separately manufactured and additionally attached to the disengagement preventing portion 210.

The abutment portion 220 abuts against the outer surface of the PCB parasitic unit 70 when the PCB parasitic unit 70 is mounted on the parasitic unit mounting bracket 10. The abutment portion 220 is made of an elastic material, and hence may cushion the PCB parasitic unit 70. In some embodiments, the abutment portion 220 is made of the same material as the bracket body 100, and may be integrally formed with the bracket body 100.

When the PCB-shaped parasitic unit 70 is mounted on the first PCB mounting mechanism 200, the disengagement preventing unit 210 passes through the first hole 710 of the PCB parasitic unit 70. Based on the resiliency of the disengagement preventing portion 210 and its outer diameter being slightly larger than the first hole 710, the disengagement preventing portion 210 is pressed radially inwardly and contracts to pass smoothly through the first hole 710. After the first hole 710 passes through the disengagement preventing portion 210, the abutment portion 220 abuts against the surface of the PCB parasitic unit 70, the disengagement preventing portion 210 expands radially, and the protrusion 211 is inserted into the first hole 710 of the PCB parasitic unit 70, thereby mounting the PCB parasitic unit 70 on the bracket 10.

The bracket body 100 is provided with at least one second PCB mounting mechanism 300. For example, the depicted bracket 10 includes one second PCB mounting mechanism 300. The second PCB mounting mechanism 300 includes a first accommodating portion 320 and a first holding portion 310. The first accommodating portion 320 is configured to accommodate the PCB parasitic unit 70. The first holding portion 310 is configured to hold the PCB parasitic unit 70 in place within the first accommodating portion 320.

The first accommodating portion 320 may comprise a concave recess in the bracket body 100. The concave recess may have a cross-sectional shape that conforms to the upper and lower outer contours of the PCB parasitic unit 70, for example rectangular here. The height of the first accommodating portion 320 may be slightly larger than a height of the PCB parasitic unit 70. The first holding portion 310 may comprise a resilient cantilevered plate which protrudes from the bracket body 100. In the depicted embodiment, the cantilevered plate is made of the same material as the bracket body 100. However, in other embodiments, the cantilevered plate may be made of other materials. In addition, a projection 311 may be provided on the first holding portion 310 that is configured to pass through a second hole 720 that is included in the PCB parasitic unit 70.

When the second PCB mounting mechanism 300 is used to mount the PCB parasitic unit 70, the PCB parasitic unit 70 is placed (preferably horizontally) into the first accommodating portion 320. In the case that an undercut portion 730 is provided in the PCB parasitic unit 70 (see FIG. 5a), the undercut portion 730 may directly contact the bottom of the first accommodating portion 320. The first holding portion 310 resiliently abuts against the PCB parasitic unit 70. In the case where the first holding portion 310 includes the projection 311, the projection 311 may pass through the second hole 720 in the PCB parasitic unit 70, thereby further holding the PCB parasitic unit 70 in place on the bracket body 100.

In the depicted embodiment, the bracket body 100 is provided with two first PCB mounting mechanisms 200 and one second PCB mounting mechanism 300, but other numbers of the first PCB mounting mechanism 200 and the second PCB mounting mechanism may be provided in other embodiments (for example, two first PCB mounting mechanisms and two second PCB mounting mechanisms 300 may be provided). According to requirements, these PCB mounting mechanisms may be disposed on the same side of the bracket body 100, or may be disposed on different sides of the bracket body 100, respectively.

The bracket body 100 is provided with a first isolation needle mounting mechanism 400. As shown in FIGS. 3 and 4, the first isolation needle mounting mechanism 400 includes a second accommodating portion 101 and a second holding portion 410. The second accommodating portion 101 may conform to the isolation needle parasitic unit 80. The second holding portion 410 may be configured to hold the isolation needle parasitic unit 80 within the second accommodating portion 101.

The second accommodating portion 101 may comprise a concave recess in the bracket body 100. The concave recess may have the same cross-section as a portion of the isolation needle parasitic unit 80 that is received within the concave recess. When a plurality of second accommodating portions 101 are provided, the second accommodating portions 101 may be, for example, sequentially disposed on the bracket body 100 along the longitudinal direction of the bracket body 100, for accommodating a plurality of isolation needle parasitic units 80 at different distances above the reflector.

The second holding portion 410 cooperates with the second accommodating portion 101 to mount an isolation needle parasitic unit 80 on the bracket body 100. In a first example implementation, a first isolation needle mounting mechanism 400 may include, for example, one second holding portion 410 and one second accommodating portion 101, for accommodating one isolation needle parasitic unit 80 as shown on the right side of the bracket body 100 in FIG. 3. In other implementations, first isolation needle mounting mechanisms 400 may be provided that include one second holding portion 410 and a plurality of (here, two) second accommodating portions 101, for mounting a plurality of (here, two) isolation needle parasitic units 80, as shown on the left side of the bracket body 100 in FIG. 3. The second holding portion 410 is, for example, constructed as a resilient cantilevered plate, which protrudes from the bracket body 100. The cantilevered plate may be made of the same material as the bracket body 100, but may also be made of other additional materials. Here, the first holding portion 310 and the second holding portion 410 are integrally formed, that is, constructed as the same member.

The bracket body 100 is also provided with a second isolation needle mounting mechanism 500. The second isolation needle mounting mechanism 500 includes at least two (here, three) opposed clamping portions 510, 520, as can best be seen in FIG. 4. These clamping portions 510, 520 extend forwardly from the bracket body 100. In some embodiments, these clamping portions 510, 520 may extend forwardly from the top of the bracket body 100, although they may also protrude in other directions from any of the side surfaces of the bracket body 100. In some embodiments, each of the clamping portions 510, 520 is provided with one or more concave portions 511, 521. These concave portions 511, 521 may have the same cross-sectional shape as a portion of the isolation needle parasitic unit 80 that is received within the second isolation needle mounting mechanism 500. Here, the second isolation needle mounting mechanism 500 is integrally formed with the bracket body 100; however, in other embodiments, the second isolation needle mounting mechanism 500 may be a separate piece that is connected to the bracket body 100.

In the depicted embodiment, the bracket body 100 includes two first isolation needle mounting mechanisms 400 and one second isolation needle mounting mechanism 500. In other embodiments, the bracket body 100 may include different numbers of first isolation needle mounting mechanisms 400 and/or second isolation needle mounting mechanisms 500 (for example, a single first isolation needle mounting mechanism 400 and two second isolation needle mounting mechanisms 500 could be provided in another example embodiment). According to requirements, these isolation needle mounting mechanisms 400, 500 may be disposed on the same side of the bracket body 100, or may be disposed on different sides of the bracket body 100 (e.g., disposed on opposite side surfaces and top surface, respectively here). When a plurality of isolation needle mounting mechanisms are provided, the isolation needle mounting mechanisms may be, for example, sequentially disposed on the bracket body 100 along the longitudinal direction of the parasitic unit mounting bracket 10.

Figure 5B:
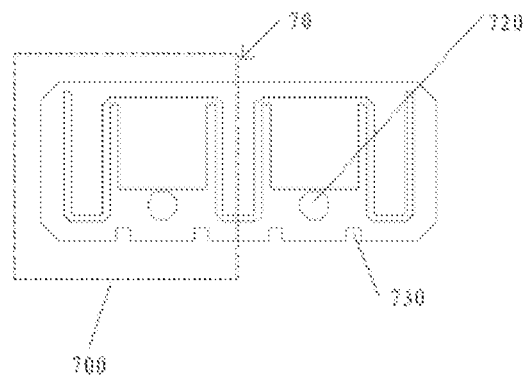
FIGS. 5A and 5B are front views of a PCB parasitic unit according to additional embodiments of the present disclosure.
Figure 5A:
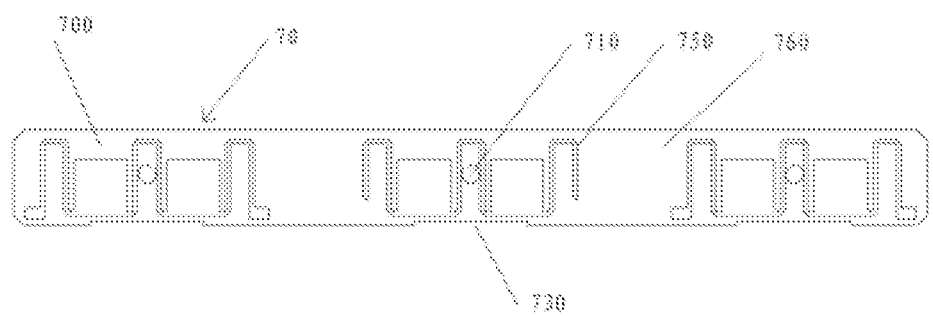

FIGS. 5A-5B show a PCB parasitic unit 70 that can be mounted in the brackets according to embodiments of the present invention. Here, the PCB parasitic unit 70 is a multi-layer structure including at least a metallic wiring layer 750 and a base layer 760 made of a non-metal. The wiring layer 750 may be made, for example, via a copper plating process and the base layer 760 may be made of plastic, fiberglass or some other dielectric material. The wiring layer 750 and the base layer 760 may also be made of other materials. Here, the PCB parasitic unit 70 has one wiring layer and two base layers 760. The two base layers 760 are disposed on respective sides of the wiring layer 750.

The PCB parasitic unit 70 may have a standardized outer contour, where the outer contour is a contour that may be close to the wiring layer 750 and, in most cases, may be substantially rectangular in shape. When the wiring layer 750 is relatively long, the PCB parasitic unit 70 may have a relatively large outer contour (see FIG. 5A). When the wiring layer is relatively short, the PCB parasitic unit 70 may have a relatively small outer profile (see FIG. 5B).

The PCB parasitic unit 70 includes at least one parasitic unit block 700. In the depicted embodiment, the parasitic unit block 700 is quadrangular in shape. According to the requirements of the antenna system, the parasitic unit blocks 700 can be connected in parallel and/or in series. In FIGS. 5A and 5B, the parasitic unit blocks 700 are connected together in the form of a rectangular array. In other embodiments, the parasitic unit block 700 may also be connected in parallel and/or in series in other forms, such as in T-shaped, L-shaped, or U-shaped.

According to the specific structure of the PCB mounting structures 200, 300 of the parasitic unit mounting bracket 10, the PCB parasitic unit 70 may include different mounting structures for mounting to the parasitic unit mounting bracket 10. FIG. 5A shows a first kind of mounting structure for the PCB parasitic unit 70, which is suitable for the first PCB mounting mechanism 200 of the parasitic unit mounting bracket 10. The first kind of mounting structure includes a first hole 710. The disengagement preventing portion 210 of the first PCB mounting mechanism may pass through the first hole 710. The first hole 710 is disposed between the wirings of the PCB parasitic unit 70. The diameter range of the first hole 710 should be between the outer diameter of the disengagement preventing portion 210 and the outer diameter of the protrusion 211 of the disengagement preventing portion 210. Thus, after the PCB parasitic unit 70 passes through the disengagement preventing portion 210 by means of the first hole 710, based on the radial resiliency of the disengagement preventing portion 210, the disengagement preventing portion 210 is restored to its original shape. Since the diameter of the first hole 710 is smaller than the outer diameter of the disengagement preventing unit 210, the PCB parasitic unit 70 may be held in place on the disengagement preventing unit 210.

A second kind of mounting structure for the PCB parasitic unit 70 can be seen in FIG. 5B, which is suitable for the second PCB mounting mechanism 300 of body 100. The second kind of mounting structure includes an undercut portion 730. The undercut portion 730 may engage the first accommodating portion 320 so that the PCB parasitic unit 70 is accommodated on the parasitic unit mounting bracket 10. Specifically, the PCB parasitic unit 70 may be placed in the first accommodating portion 320, i.e., the concave portion of the parasitic unit mounting bracket 10. The undercut portion 730 abuts against or latches with the bottom of the first accommodating portion 320. The PBC parasitic unit 70 can be further fixed to the parasitic unit mounting bracket 10 by the first holding portion 310.

The second kind of mounting structure further includes a second hole 720. In the case where the PCB parasitic unit 70 is accommodated in the parasitic unit mounting bracket 10, the projection 311 disposed on the first holding portion 310 may pass through the second hole 720 so that the PCB parasitic unit 70 is held firmly in place against the bracket body 100. In some embodiments, the second hole 720 may be omitted.

The first hole 710 and the second hole 720 may be disposed anywhere along the PCB parasitic unit 70 as long as they do not interfere with the wiring layer 750.

In order to mount the PCB parasitic unit 70 on the parasitic unit mounting bracket 10 according to the present disclosure, the above-described first kind of mounting structure according to FIG. 5A may be separately provided on the PCB-shaped parasitic unit 70 or the above-mentioned second kind of mounting structure according to FIG. 5B may be separately provided, or the aforementioned two kinds of mounting mechanisms may both be provided.

Figure 6:
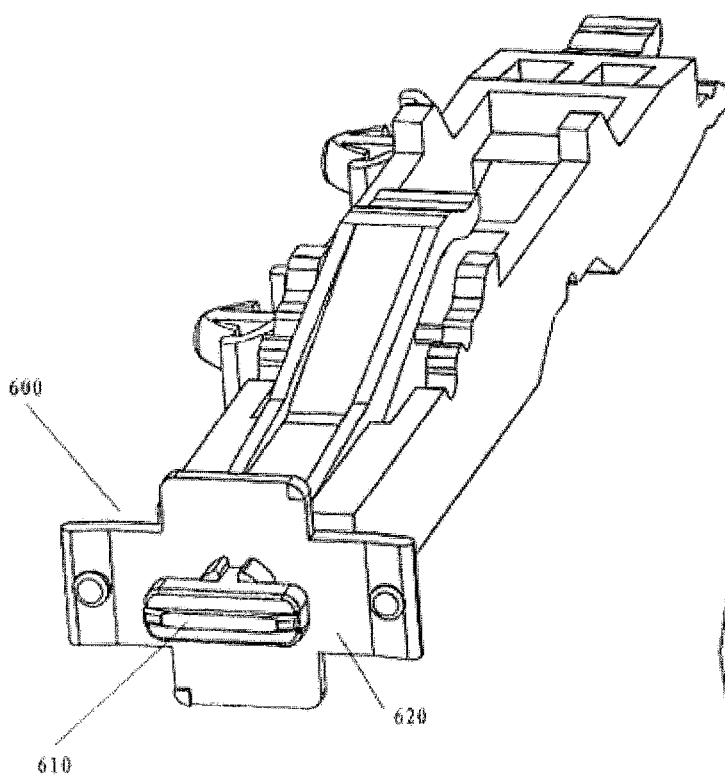
FIG. 6 is a perspective view of the bracket of FIG. 2 that illustrates a body mounting mechanism that is included on the bracket.
Figure 7:
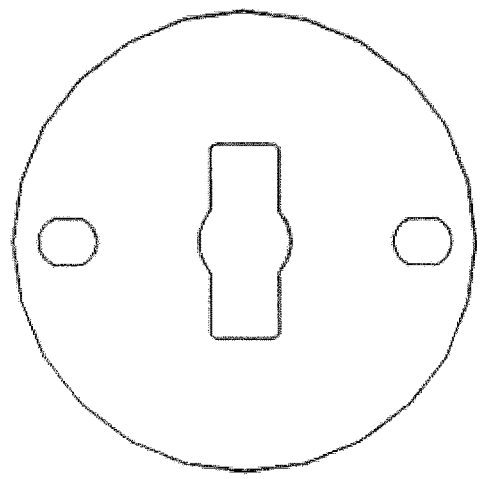
FIG. 7 is a front view of a reflector illustrating openings that may be used to mount the brackets according to embodiments of the present disclosure.

FIG. 6 is a bottom perspective view of the parasitic unit mounting bracket 10 that shows a body mounting mechanism 600 that may be used to mount the bracket body 100 to the reflector, and FIG. 7 shows a corresponding portion of the reflector on which the parasitic unit mounting bracket 10 may be mounted. As shown in FIG. 6, the body mounting mechanism 600 is disposed at the bottom (rear) of the parasitic unit mounting bracket 10. The body mounting mechanism 600 includes a pin portion 610 and a stop portion 620. As shown in FIG. 7, the reflector is provided with an opening that is slightly larger than the cross-sectional shape of the pin portion 610. When the bracket body 100 is connected to the reflector, the pin portion 610 passes through the opening in the reflector; then the bracket body 100 is rotated relative to the reflector by certain angle, for example, 60°-120°, preferably 80°-100°, and especially preferably 90°. As a result, the stop portion 620 passes over the opening in the reflector and abuts against the surface of the reflector. The pin portion 610 is preferably non-cylindrical, such as a rectangular cylindrical shape or an elliptical cylindrical shape.

Figure 8:
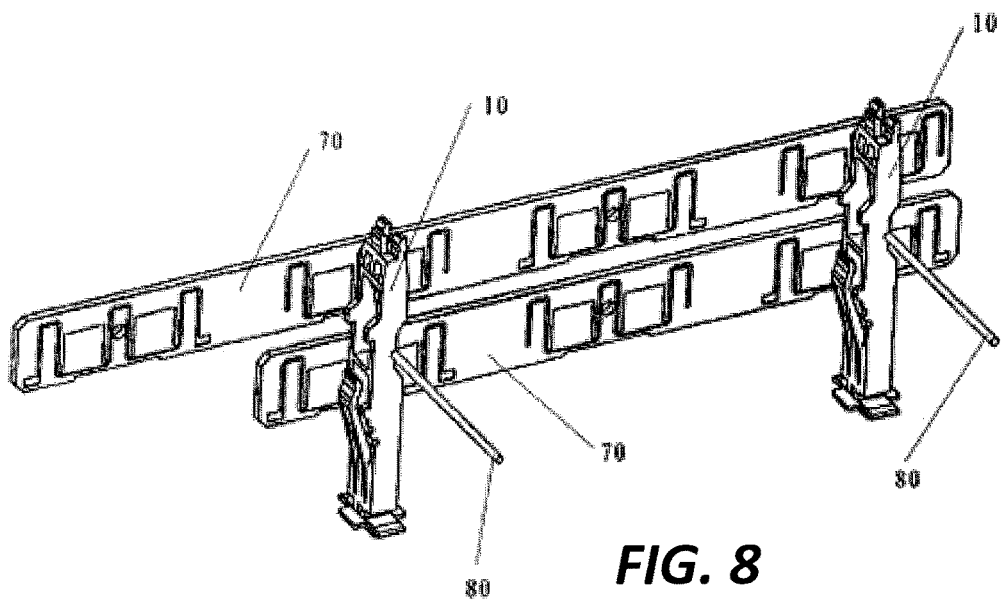
FIG. 8 is a perspective view of an antenna unit that includes parasitic unit brackets according to embodiments of the present disclosure.

FIG. 8 is a perspective view of an antenna unit according to embodiments of the present disclosure. The antenna unit includes the aforementioned parasitic unit mounting bracket 10, at least one PCB parasitic unit 70, and at least one isolation needle parasitic unit 80.

In the depicted embodiment, the antenna unit includes two parasitic unit mounting brackets 10, two PCB parasitic units 70, and two isolation needle parasitic units 80. Two isolation needle parasitic units 80 are disposed on the respective parasitic unit mounting brackets 10, and here are disposed on the parasitic unit mounting brackets 10 by means of the first isolation needle mounting mechanism s 400. One or more additional isolation needle parasitic units 80 may be mounted using the second isolation needle mounting mechanisms 500. The arrangement of these parasitic units may be adjusted correspondingly according to specific operational requirements, for example by using various PCB mounting mechanisms 200, 300 and/or isolation needle mounting mechanisms 400, 500.

Therefore, the antenna units according to the present disclosure are modular, and a person skilled in the art can combine these antenna units simply and at low cost as required. This improves the production efficiency and reduces the production cost.

Although the exemplary embodiments of the present disclosure have been described, a person skilled in the art should understand that, he or she can make multiple changes and modifications to the exemplary embodiments of the present disclosure without substantively departing from the spirit and scope of the present disclosure. Accordingly, all the changes and modifications are encompassed within the protection scope of the present disclosure as defined by the claims. The present disclosure is defined by the appended claims, and the equivalents of these claims are also contained therein.

That which is claimed is:

1. A parasitic unit mounting bracket, comprising:
a bracket body;
a printed circuit board ("PCB") mounting mechanism provided on the bracket body that is configured to mount a PCB parasitic unit forwardly of a reflector of an antenna, the antenna including a plurality of dipole radiators that are mounted to extend forwardly from the reflector; and
an isolation needle mounting mechanism provided on the bracket body that is configured to mount an isolation needle parasitic unit forwardly of the reflector,
wherein the PCB parasitic unit and the isolation needle parasitic unit are each configured to adjust radiation patterns of the antenna.

2. The bracket according to claim 1, wherein the PCB mounting mechanism includes a first PCB mounting mechanism that includes an abutment portion that is configured to abut against the PCB parasitic unit and a disengagement preventing portion that is configured to prevent the PCB parasitic unit from being disengaged from the abutment portion.

3. The bracket according to claim 2, wherein the PCB mounting mechanism further comprises a second PCB mounting mechanism that includes a first accommodating portion that is configured to accommodate the PCB parasitic unit and a first holding portion that is configured to hold the PCB parasitic unit at the first accommodating portion.

4. The bracket according to claim 3, wherein the first holding portion includes a resilient cantilevered plate that protrudes from the bracket body.

5. The bracket according to claim 4, wherein the resilient cantilevered plate further includes a projection that is configured to pass through the PCB parasitic unit.

6. The bracket according to claim 3, wherein the first accommodating portion includes a concave portion that is recessed inwardly from the bracket body.

7. The bracket according to claim 3, wherein a hole is provided on the PCB parasitic unit that is configured to pass through a projection disposed on the first holding portion.

8. The bracket according to claim 2, wherein a first hole is provided in the PCB parasitic unit, and the disengagement preventing portion is configured to pass through the first hole.

9. The bracket according to claim 1, wherein the PCB mounting mechanism includes a first holding portion that is configured to hold the PCB parasitic unit at a first accommodating portion, and wherein the isolation needle mounting mechanism includes a first isolation needle mounting mechanism which includes a second accommodating portion that is configured to accommodate the isolation needle parasitic unit and a second holding portion that is configured to hold the isolation needle parasitic unit at the second accommodating portion.

10. The bracket according to claim 9, wherein the second holding portion includes a resilient cantilevered plate that protrudes from the bracket body.

11. The bracket according to claim 9, wherein the second accommodating portion includes one or more concave portions that are recessed inwardly from the bracket body.

12. The bracket according to claim 9, wherein a plurality of additional first isolation needle mounting mechanisms are sequentially provided on the bracket body along a longitudinal direction of the bracket.

13. The bracket according to claim 9, wherein the first holding portion and the second holding portion are formed as a monolithic part.

14. The bracket according to claim 9, wherein the isolation needle mounting mechanism further includes a second isolation needle mounting mechanism, which includes at least two opposed clamping portions.

15. The bracket according to claim 1, wherein the bracket further comprises a body mounting mechanism at a bottom of the bracket body that is configured to connect the bracket body to an antenna.

16. The bracket according to claim 1, wherein the PCB parasitic unit includes one or more parasitic unit blocks.

17. The bracket according to claim 16, wherein the parasitic unit blocks are connected in series and/or in parallel with each other.

18. A parasitic unit mounting bracket, comprising:
a bracket body;
a printed circuit board ("PCB") mounting mechanism provided on the bracket body that is configured to mount a PCB parasitic unit; and
an isolation needle mounting mechanism provided on the bracket body that is configured to mount an isolation needle parasitic unit,
wherein the PCB mounting mechanism includes a first PCB mounting mechanism that includes an abutment portion that is configured to abut against the PCB parasitic unit and a disengagement preventing portion that is configured to prevent the PCB parasitic unit from being disengaged from the abutment portion, and
wherein a protrusion that is configured to receive the PCB parasitic unit is provided on a side of the disengagement preventing portion that faces the abutment portion.

* * * * *